United States Patent Office 2,810,370
Patented Oct. 22, 1957

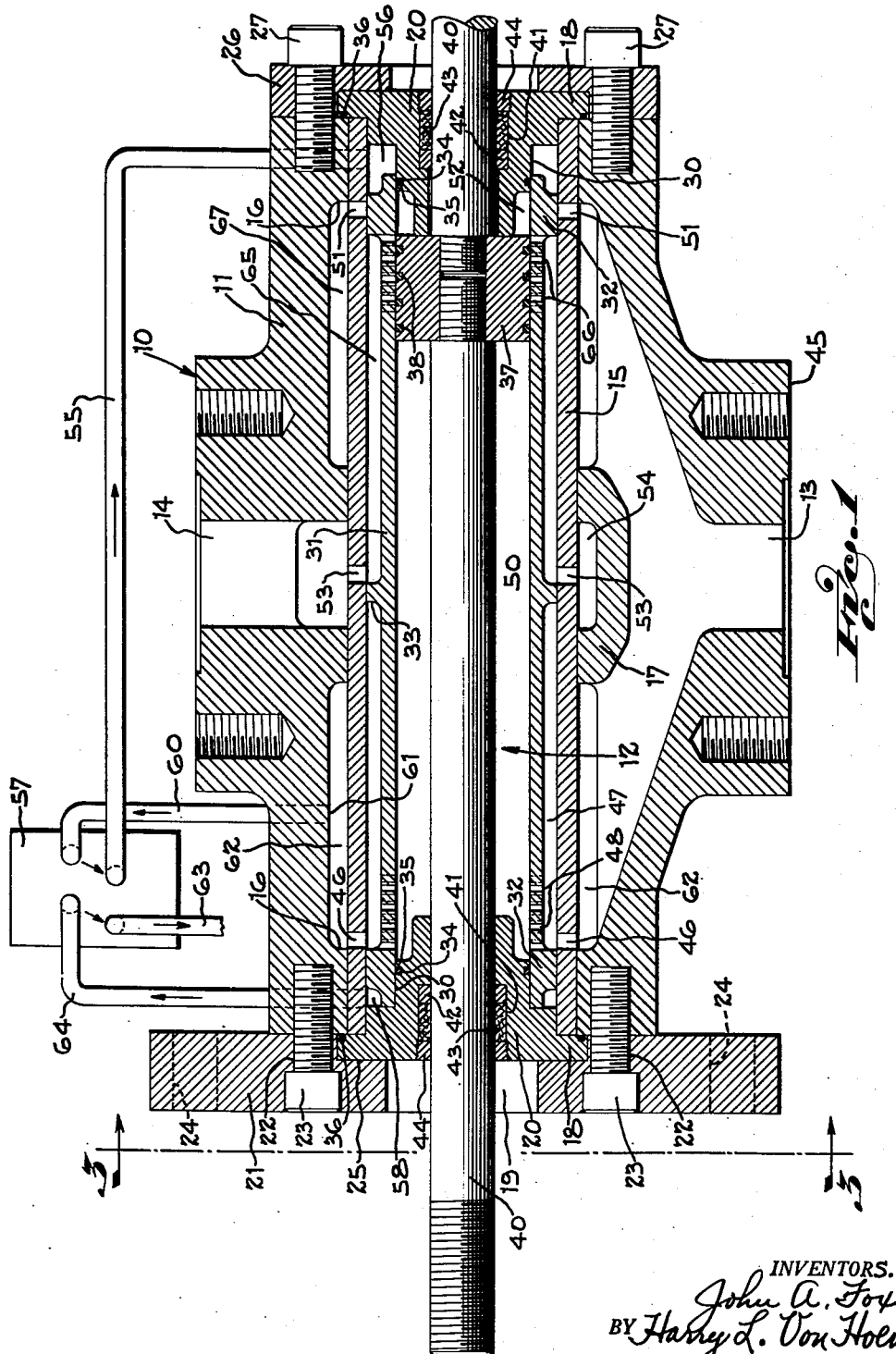

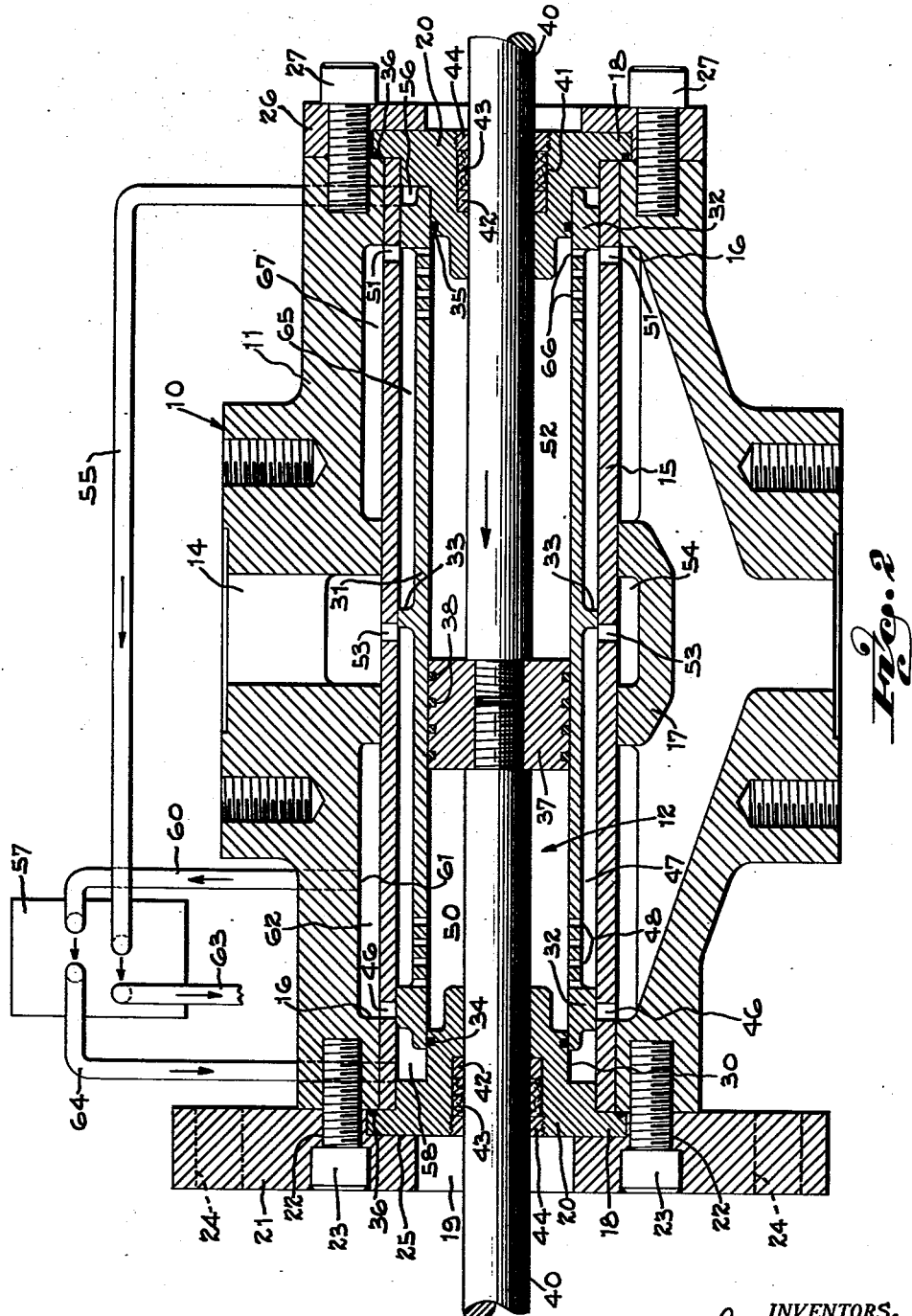

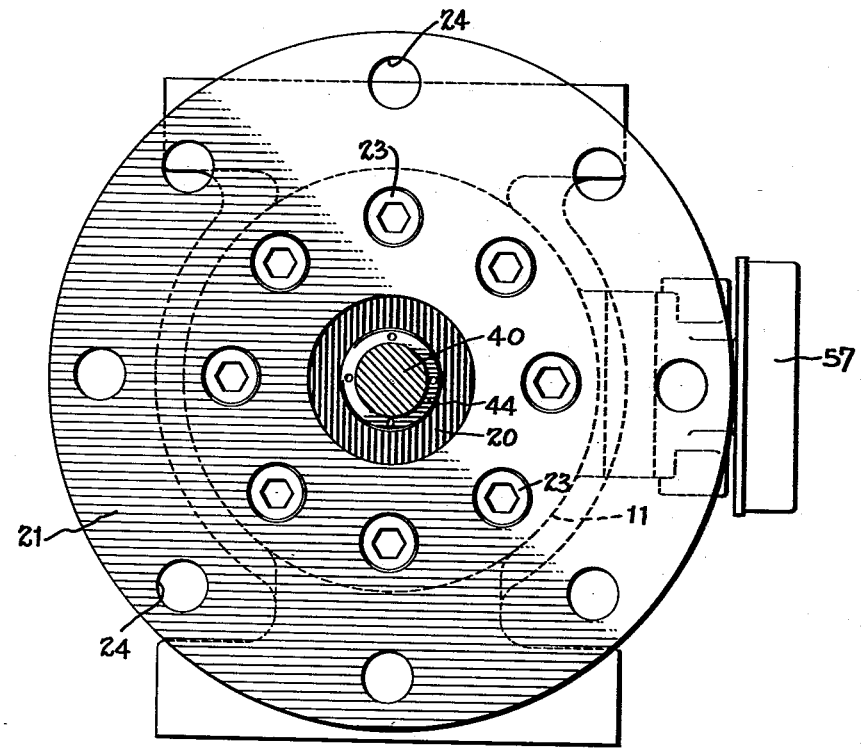

2,810,370

COMBINED POWER CYLINDER AND VALVE CONSTRUCTION

John A. Fox and Harry L. Von Hoene, Cincinnati, Ohio, assignors to Pathon Manufacturing Company, Cincinnati, Ohio, a corporation of Ohio Application January 18, 1954, Serial No. 404,713

6 Claims. (Cl. 121—38)

This invention relates to hydraulic mechanisms and is particularly directed to a hydraulic operator having a reciprocating piston adapted to actuate an associated mechanical device.

The present hydraulic operator is primarily intended for use in installations in which it is desirable to actuate a mechanical element rapidly in response to the closing of an electric circuit to a small pilot valve, or the manual or mechanical operation of the pilot valve. For example, in a catapult mechanism for launching aircraft, it is desirable to have a large valve open in response to the actuation of a small pilot valve to apply pneumatic or hydraulic pressure to an elongated ram or other driving means. Also, in certain types of safety equipment it is desirable to close a large valve quickly, stopping the flow of a sizable stream of inflammable liquid, in response to the closing of a small thermostatic switch. There are many other applications in which it is desirable to actuate a sizable mechanical device with extreme rapidity in response to the actuation of a small control element.

The primary object of the present invention is to provide a hydraulic operator, including a piston, movable in response to the operation of a small valve, and adapted to rapidly actuate a mechanical device by shifting one of its component elements through a substantial displacement in a small fraction of a second. Thus, one operator constructed in accordance with the present invention includes a piston which moves twenty-two inches in less than one-tenth of a second, while exerting a force of thirty-six thousand pounds. This piston, which supplies hundreds of horsepower during its operation, is controlled by a small readily actuated pilot valve.

The present invention is predicated upon the concept of mounting a primary valve within the operator housing and disposing a piston within the primary valve. The primary valve is controlled by the pilot valve and in turn controls the application of primary pressure fluid to the piston. A large volume of pressure fluid is maintained in an area surrounding the primary pressure valve and upon actuation of that valve, this fluid is immediately applied to the piston, transmitting almost the entire available pressure with minimum losses due to turbulence and friction.

More particularly, a valve constructed in accordance with the present invention comprises a main housing configurated to form a central pressure chamber and suitable pressure fluid connections; a cylindrical shell is disposed within the pressure chamber surrounding a slidable primary valve sleeve which in turn houses a reciprocating piston. Suitable pilot pressure conduits and auxiliary pressure chambers are provided so that the valve sleeve is shifted in response to the application of a pilot pressure fluid, the flow of which is controlled by the actuation of a small pilot valve. The primary valve sleeve contains a plurality of ports communicating with the piston chamber and a number of flanges adapted to cover ports in the shell.

When the flanges of the primary valve sleeve cover the ports in the shell, the pressure fluid is blocked from the chamber behind the piston. However, when the sleeve is shifted to uncover the shell ports, fluid flows from the space surrounding the shell through the sleeve and into the chamber behind the piston.

One of the principal advantages of the present operator is that it minimizes pressure losses due to friction and turbulence so that maximum pressure is applied to the piston and it completes its stroke within a fraction of a second after the actuation of the pilot valve. Thus, the actuation of the small pilot valve is effective to cause the practically instantaneous operation of a sizable mechanical device.

A second advantage of the present operator is that it is extremely compact. Both the primary valve and piston are concentrically mounted within the same housing so that the over-all size of the unit is not very much larger than that of a conventional hydraulic cylinder and is considerably smaller than the combination of such a cylinder and a conventional valve, since both the housing for a conventional primary valve and the piping normally required for connecting that valve to the piston are eliminated.

A further advantage of the present operator construction is that the port arrangement in the primary valve which provides for rapid actuation of the piston also provides for automatic damping of the piston movement at the end of its travel. This greatly reduces the vibrations produced in the actuation of the operator and lengthens its useful life.

Another advantage of the present operator is that it is relatively inexpensive to manufacture and install. The operator comprises a minimum number of parts, and no piping is required between the primary valve and piston. Furthermore, in the preferred embodiment, the pilot valve is mounted upon the main operator housing; and the pilot fluid conduits are bored in the housing, eliminating the need for any pilot pressure piping.

These and other advantages of the present invention will be apparent from a consideration of the following description of the drawings illustrating a preferred embodiment of the invention.

In the drawings:

Figure 1 is a longitudinal cross sectional view taken through an operator with its piston in a retracted position; the pilot control piping being shown in schematic form.

Figure 2 is a cross sectional view similar to Figure 1, showing the operator with its piston in a partially advanced position.

Figure 3 is a view taken along line 3—3 of Figure 1, showing one end of the operator.

As shown in Figures 1 and 2, an operator 10 constructed in accordance with the present invention comprises a main housing 11 configurated to form a generally longitudinal opening 12 and pressure fluid ports 13 and 14. A cylindrical shell 15 is disposed within the housing in engagement with shoulders 16 formed at the ends of the housing and with the inner surface of central channel 17. The ends of shell 15 are in abutment with flanges 18 of packing glands 20, mounted at each end of the housing.

One of the packing glands is secured in place by means of mounting plate 21 which clamps the packing gland flange against the end of housing 11. Mounting plate 21 is provided with a central opening 19 and is counterbored as at 25 to receive flange 18. The mounting plate is also provided with a plurality of bolt holes 22 for receiving bolts 23 by means of which the plate is bolted to the housing, and a second plurality of bolt holes 24 adapted to receive suitable mounting bolts for securing the operator to other equipment. The second packing gland is secured against the opposite end of the housing by means of end plate 26 which is counterbored to receive flange 18 of the packing gland and is provided with a plurality of bolt holes for receiving bolts 27 by means of which the end plate is fastened to the end of the housing.

Each of the packing glands includes a cylindrical shoulder 30 effective to provide a bearing surface for a cylindrical sleeve or spool 31, slidably disposed within shell 15. Sleeve 31 constitutes one element of the primary valve and is provided with two end flanges 32 in engagement with the inner surface of shell 15 and the outer surface of shoulders 30. The sleeve also includes a central flange 33 in engagement with the inner surface of shell 15. Suitable sealing members, such as O rings 34, recessed in grooves 35 provide a fluid tight connection between the sleeve and packing gland 20. Similar sealing members 36 are compressed between flanges 18 of the packing glands and the housing 11.

A piston head 37 is reciprocally mounted within sleeve 31, sealing engagement between the piston head and inner sleeve wall being effected by means of a plurality of piston rings 38, formed of cast iron or other similar material. In the embodiment shown, two piston rods 40—40 threadably engage, or are otherwise secured to, the piston head and extend outwardly through central openings in the packing glands 20 at either end of the housing. It will be appreciated that the provision of a double piston rod facilitates the use of an actuator with mechanisms including a yoke type connection member; and in addition, the double end piston rod construction is often preferred for certain hydraulic considerations, such as the fact that it provides the same fluid capacity on both sides of the piston. Obviously, if these considerations are not important in a particular installation, one of the piston rods may be omitted.

Each packing gland is provided with a cylindrical opening 41 surrounding the piston rod and of larger diameter than the rod so that an annular space is formed around the rod at the outer portion of the packing gland. An inner packing seat bearing 42 is inserted in this space for providing a bearing surface for rod 40. Suitable packing material 43, such as a plurality of compressible V rings, is disposed in the annular space; this packing material is compressed between the inner packing seat and an outer packing bearing 44 which is threaded into the end of the annular opening in the packing gland.

Primary pressure fluid, for actuating the piston, is introduced through inlet 13. It will be understood that any suitable type of pipe connection can be secured to boss 45 for connecting the inlet to a pump or other source of fluid pressure. As shown in Figure 1, when the piston is in its retracted position, fluid passes through ports 46 in shell 15 and enters the annular space 47 formed between shell 15 and the sleeve 31. The primary pressure fluid also flows through forward ports 48 in the valve sleeve and enters chamber 50 in front of the piston head. Ports 51 in the rear end of the shell are sealed by rear flange 32 of the sleeve so that no primary fluid enters chamber 52 behind the piston. However, chamber 52 is in communication with port 14 to which a drain line leading back to the pump is connected in any suitable manner. Fluid flows to the drain from chamber 52 through center ports 53 in shell 15 and central channel 54 which extends circumferentially around the shell and opens into port 14.

Sleeve 31 is held in its forward position by means of pilot fluid pressure supplied through conduit 55 to channel 56 defined by gland 20, shell 15 and end flange 32 of the sleeve. Conduit 55 is connected to pilot valve 57 which is a directional control valve of any conventional construction adapted to selectively supply pressure to either space 56 or space 58. In the preferred embodiment pilot valve 57 is a four-way valve including one or more solenoids (not shown) actuable in response to the closing of an electrical circuit for shifting a plunger within the valve housing to alter the pattern of fluid flow through the valve. It will be understood that if desired, the pilot valve can be of a manually or mechanically operated type. When a solenoid is de-energized, line 55 is connected to pressure line 60 which is in communication with the primary pressure fluid, as at 61 in chamber 62. At the same time, drain line 63 is connected to line 64, permitting the fluid in space 58 to return to the pump. When a solenoid of pilot valve 57 is energized, a plunger (not shown) within the valve is shifted so that pressure line 60 is connected to line 64 and drain line 63 is connected to line 55. It will be understood that the pilot pressure piping is diagrammatically shown in Figures 1 and 2. In practice it is preferable to mount valve 57 upon housing 11 as shown in Figure 3. The various conduits such as pressure conduit 60 and conduits 55 and 64 can then be drilled through the housing or can be formed by small pressure tubing.

When the pilot valve is actuated, pilot pressure is applied to chamber 58 formed by forward gland 20, shell 15 and flange 32 of the sleeve, forcing the sleeve to the right into the position shown in Figure 2. With the sleeve in this position, fluid trapped in chamber 56 drains through lines 55 and 63 to the pump. The shifting of sleeve 31 to the right also brings forward flange 32 into registry with ports 46, sealing off annular space 47 and chamber 50 from the primary pressure fluid. Also center flange 33 of the sleeve is shifted to the right of ports 53 so that chamber 50 and annular space 47 are connected through this port to the drain line joined to port 14.

When the sleeve is shifted to the right, rear flange 32 of the sleeve is moved to a position uncovering port 51 so that primary pressure fluid enters annular space 65 and passes through ports 66 into chamber 52 behind the piston head. The effect of this pressure is to force the piston to the left as shown in Figure 2. It is apparent that the main pressure fluid passes only through two sets of ports in flowing from the pressure fluid inlet to chamber 52. That is, full operating pressure is maintained at all times in annular space 67, and upon the opening of the primary valve ports 51 by the shifting of sleeve 31, this full pressure is immediately applied to the chamber behind the piston with only a negligible loss due to turbulence and fluid friction. As will be explained in detail below, the piston can be retracted by returning the pilot valve to its original position.

In the preferred embodiment, the piston head 37 cooperates with ports 48 to provide a damping action as the piston head nears the end of its stroke. That is, the fluid entrapped in chamber 50 in front of the piston head is forced out of the chamber through ports 48 as the piston advances to the left. However, as the piston nears the end of its stroke, it covers several of the ports 48 disposed furthest to the right. This impedes the escape of fluid from chamber 50 and a counteracting force is thus established to slow the movement of the piston to the left. As the piston continues to advance to the left, more of the ports are covered so that less fluid can escape and a higher pressure is built up in chamber 50 increasing the damping action on the piston.

In use, the operator is mounted on or adjacent to a valve or other device to be actuated, by passing bolts through the openings in mounting plate 21. A yoke or lever connected to the valve or other device is joined to the threaded end of the piston rods 40. A hydraulic pump is connected to pressure inlet 13 and a drain line, running back to the pump or to its sump, is joined to port 14. Finally, suitable electric or mechanical connections are made for actuating pilot valve 57.

Assuming that the piston head is initially in its retracted position as shown in Figure 1, hydraulic pressure fluid is introduced into port 13 at a suitable pressure, for example 3,000 p. s. i.; and flows through annular space 62 and forward shell ports 46 into space 47 and through sleeve ports 48 into chamber 50 in front of the piston.

The pressure fluid is blocked from entering chamber 52, behind the piston, by rear flange 32 of the primary valve sleeve which covers ports 51 in shell 15.

High pressure fluid is also supplied to pilot valve 57 through tube 60 which is tapped into annular space 62. As shown in Figure 1, the pilot valve is set so that pressure line 60 is connected to line 55 which supplies the fluid to annular space 56 urging the primary valve sleeve forward. At the same time, the pilot valve interconnects line 64 to drain line 63 so that the fluid in forward annular chamber 58 is returned to the pump.

Upon actuation of pilot valve 57, pressure line 60 is connected to line 64 while line 55 is connected to drain line 63. This causes sleeve 31 to be shifted to the right under the influence of the pilot pressure built up in forward annular space 58 while the fluid in annular space 56 drains through lines 55 and 63. When the primary valve sleeve is shifted to the right, pressure is cut off from chamber 50 by forward flange 32 of the sleeve which covers forward ports 46 in the shell. Fluid in this chamber drains through ports 48 in the sleeve, central ports 53 in the shell, central channel 54 and port 14. At the same time, rear ports 51 in the shell are uncovered and primary pressure fluid enters space 65 and chamber 52 behind the piston. Since there is a large quantity of primary pressure fluid, surrounding shell 15, and since this fluid flows only through two sets of ports to enter chamber 52, substantially the entire pressure available at inlet 13 is applied to the piston head causing the piston head and rod 40 to be shifted rapidly to the left.

Piston movement continues in this direction until the piston head nears the left hand end of the housing at which time it covers some of ports 48 in the valve sleeve, retarding the discharge of fluid from chamber 50. As a result, a back pressure is built up in this chamber slowing down the piston. At the piston advances further to the left, more ports are covered and a greater pressure is built up within chamber 50; so that the piston is effectively damped and vibrations are substantially reduced at the end of the piston stroke.

To actuate the piston in the reverse direction and return it to its retracted position, pilot valve 57 is operated to return the pilot valve connections to their original condition in which pressure line 60 is connected to line 55 and drain line 63 is connected to line 64 as shown in Figure 1. This causes primary fluid to be introduced to chamber 50 through ports 46 and 48 and likewise causes the fluid in chamber 52 to be drained through ports 66 and 53 and central channel 54 to drain port 14. As the piston approaches its retracted position, its travel is damped due to the closing of ports 66 impeding the fluid discharge from chamber 52 and causing a back pressure to be built up in that chamber.

From the foregoing discussion of the general principles of our invention and the detailed description of a preferred embodiment, those skilled in the art will readily comprehend the various modifications to which the invention is susceptible.

Having described our invention, we claim:

1. A hydraulic operator comprising a housing configurated to form a longitudinal opening, and a pressure fluid inlet and exhaust port in communication with said opening, a shell mounted within said opening, a primary valve sleeve reciprocally mounted within said shell, a piston slidably mounted within said sleeve and defining with said sleeve a chamber behind said piston, said housing being configurated to form a primary fluid space disposed exteriorly of said shell, said shell being provided with a port communicating with said fluid space, said sleeve being configurated to form a flange, said flange being in slidable engagement with said shell and being adapted to cover said port, said sleeve being reciprocable from a first position in which said port is covered by said flange to a second position in which the flange does not cover said port, an auxiliary pressure chamber formed within said operator housing, said chamber including a portion of the valve sleeve as one wall thereof, and being arranged so that when pilot fluid pressure is introduced into said auxiliary chamber the valve sleeve is urged toward its second position, said valve sleeve being provided with a port communicating with the chamber behind the piston.

2. A hydraulic operator comprising a housing configurated to form a longitudinal chamber and a pressure fluid inlet and discharge port in communication with said chamber, a cylindrical shell disposed within said chamber, a cylindrical sleeve slidably disposed within said shell, said sleeve being configurated to form a flange adjacent to each end thereof and a central flange intermediate said end flanges, each of said flanges being in slidable engagement with said shell, said sleeve also being configurated to form a port adjacent to either end thereof, said shell being configurated to form a port adjacent to either end thereof, and a central port disposed intermediate the end ports and in fluid communication with the drain port, said sleeve being reciprocable between a first position in which one of its end flanges covers one of the ports in said shell, the other port being uncovered, and a second position in which the other end flange of the sleeve covers the opposite port, the central flange being located on the sleeve so that it is at all times disposed on the same side of said central port as the uncovered shell port, a piston reciprocally mounted within said sleeve and defining therewith a fluid chamber on each side of said piston, the ports in said sleeve being disposed on opposite sides of said piston, and pilot pressure fluid means effective to selectively urge said sleeve into said first position and said second position.

3. A hydraulic operator comprising a housing configurated to form a longitudinal chamber and a pressure fluid inlet and discharge port in communication with said chamber, a cylindrical shell disposed within said chamber, a cylindrical sleeve slidably disposed within said shell, said sleeve being configurated to form a flange adjacent to each end thereof and a central flange intermediate said end flanges, each of said flanges being in slidable engagement with said shell, said sleeve also being configurated to form a plurality of ports adjacent to either end thereof, the ports adjacent each end extending over an area spaced from the end, said shell being configurated to form a port adjacent to either end thereof, and a central port disposed intermediate the end ports and communicating with the drain port, said sleeve being reciprocable between a first position in which one of its end flanges covers one of the ports in said shell, the other port being uncovered, and a second position in which the other end flange of the sleeve covers the opposite port, the central flange being located on the sleeve so that it is at all times disposed on the same side of the central port as the uncovered shell port, a piston reciprocally mounted within said sleeve and defining therewith a fluid chamber on each side of said piston, the ports in said sleeve being disposed on opposite sides of said piston and being gradually closed by said piston as it nears the end of its stroke, and pilot pressure fluid means effective to selectively urge said sleeve into said first position and said second position.

4. A hydraulic operator comprising a housing configurated to form a longitudinal chamber and a pressure fluid inlet and discharge port in communication with said chamber, a cylindrical shell disposed within said chamber, a cylindrical sleeve slidably disposed within said shell, said sleeve being configurated to form a flange adjacent to each end thereof and a central flange intermediate said end flanges, each of said flanges being in slidable engagement with said shell, said sleeve also being configurated to form a port adjacent to either end thereof, said shell being configurated to form a port adjacent to either end thereof, and a central port disposed intermediate the end ports and in fluid communication with the drain port, said sleeve being reciprocable between a first position in which one of its end flanges covers one of the ports in said shell, the other port being uncovered, and a second position in which the other end flange of the sleeve covers the opposite port, the central flange being located on the sleeve so that it is at all times disposed on the same side of said central port as the uncovered shell port, a piston reciprocally mounted within said sleeve and defining therewith a fluid chamber on each side of said piston, the ports in said sleeve being disposed on opposite sides of said piston, and pilot pressure fluid means effective to selectively urge said sleeve into said first position and said second position, said pilot pressure fluid means comprising two auxiliary pressure chambers formed within said housing, one of said chambers being disposed at either end of said sleeve and having a flange of said sleeve comprising one wall of said chamber, whereby the introduction of pilot pressure fluid to one of said chambers causes said sleeve to be urged toward its first position and the introduction of fluid pressure into the opposite chamber causes the sleeve to be urged toward its second position.

5. A hydraulic operator comprising a housing configured to form a longitudinal chamber and a pressure fluid inlet and discharge port in communication with said chamber, a cylindrical shell disposed within said chamber, a cylindrical sleeve slidably disposed within said shell, said sleeve being configured to form a flange adjacent to each end thereof and a central flange intermediate said end flanges, each of said flanges being in slidable engagement with said shell, said sleeve also being configured to form a plurality of ports adjacent to either end thereof, the ports adjacent each end extending over an area spaced from the end, said shell being configurated to form a port adjacent to either end thereof, and a central port disposed intermediate the end ports and communicating with the drain port, said sleeve being reciprocable between a first position in which one of its end flanges covers one of the ports in said shell, the other port being uncovered, and a second position in which the other end flange of the sleeve covers the opposite port, the central flange being located on the sleeve so that it is at all times disposed on the same side of the central port as the uncovered shell port, a piston reciprocally mounted within said sleeve and defining therewith a fluid chamber on each side of said piston, the ports in said sleeve being disposed on opposite sides of said piston and being gradually closed by said piston as it nears the end of its stroke, and pilot pressure fluid means effective to selectively urge said sleeve into said first position and said second position, said pilot pressure fluid means comprising two auxiliary pressure chambers formed within said housing, one of said chambers being disposed at either end of said sleeve and having a flange of said sleeve comprising one wall of said chamber, whereby the introduction of pilot pressure fluid to one of said chambers causes said sleeve to be urged toward its first position and the introduction of fluid pressure into the opposite chamber causes the sleeve to be urged toward its second position.

6. A hydraulic operator comprising a housing configurated to form a longitudinal opening, and a pressure fluid inlet and exhaust port in communication with said longitudinal opening, a shell mounted within said opening, a primary valve sleeve reciprocally mounted within said shell, a piston slidably mounted within said valve sleeve and defining with said sleeve a chamber on either side of said piston, said housing being configurated to form a primary fluid space communicating with said inlet and disposed exteriorly of said shell, said shell being provided with two longitudinally spaced end ports, communicating with said fluid space, said sleeve being configurated to form two spaced flanges, said flanges being in slidable engagement with said shell and being adapted to cover said ports, said sleeve being reciprocable from a first position in which one of said ports is covered by one of said flanges to a second position in which the other of said ports is covered by the second flange, auxiliary pressure chambers formed within said operator housing, each of said chambers including a portion of the valve sleeve as one wall thereof, said chambers being arranged so that when pilot fluid pressure is introduced into one of said chambers the valve sleeve is urged toward its first position and when pilot fluid pressure is introduced into the opposite chamber the valve sleeve is urged toward its second position, said valve sleeve being provided with two spaced ports communicating with the said chambers on opposite sides of the piston, a central flange disposed on said valve sleeve intermediate said ports and in engagement with said sleeve, a central channel formed in said housing surrounding said shell, said shell containing a central port in communication with said channel, the central flange of said valve sleeve being shiftable from one side of said port to the opposite side thereof.

References Cited in the file of this patent

UNITED STATES PATENTS

| | | |
|---|---|---|
| 424,609 | Kempster | Apr. 1, 1890 |
| 576,576 | Haughn | Feb. 9, 1897 |
| 2,292,336 | Farnham | Aug. 4, 1942 |
| 2,342,256 | Duffy | Feb. 22, 1944 |